UNITED STATES PATENT OFFICE.

EDWARD B. BONSTEIN, OF WEST PITTSTON, PENNSYLVANIA.

ACID-PROOF COATING FOR METALS.

1,207,845.　　　　Specification of Letters Patent.　　Patented Dec. 12, 1916.

No Drawing.　　Application filed September 1, 1914.　Serial No. 859,709.

*To all whom it may concern:*

Be it known that I, EDWARD B. BONSTEIN, a citizen of the United States, residing at West Pittston, in the county of Luzerne and State of Pennsylvania, have invented certain new and useful Improvements in Acid-Proof Coating for Metals, of which the following is a specification.

This invention has reference to compositions, and its object is to provide an acid-proof compound to serve as a coating for metals.

While the present invention has a considerable range of utility, since it may be used for the protection of metallic surfaces against corrosion under various circumstances, it is particularly useful for the protection of metal pipes in mines, especially where sulfur fumes or sulfur water is prevalent.

The compound of the present invention consists of rosin as the body material, alcohol which serves as a solvent for the rosin, and oil of turpentine which imparts to the solution sufficient elasticity to permit the ready application of the mixture to metals by means of a brush and the adherence of the mixture to such metals.

The composition is made up in the proportions of seven quarts of alcohol, one quart of turpentine, and eleven to fifteen pounds of rosin. Denatured or wood alcohol may be employed and it is possible to substitute other solvents of rosin for the alcohol, but such solvents, and especially highly volatile hydrocarbons, are dangerous to use in mines where the fumes may readily catch fire and cause disastrous explosions. Alcohol is a sufficiently cheap solvent for use, evaporates with sufficient rapidity, but is not so highly volatile as to cause dangerous fumes in a mine, and hence is preferred to other solvents.

The proportions given are important as experience has shown that a close adherence to such proportions is necessary in order to obtain a permanent coating for the metal which will adhere thereto and resist the direct action of acids or the corrosive action of acid or other corrosive fumes. Nor may other ingredients be mixed with the three named, since experience has demonstrated that the results obtained cannot be produced with additional ingredients present, and in most cases the particular merits of the composition are entirely destroyed by the presence of other ingredients.

The present invention provides a composition applicable with a brush to metal pipes or other metal surfaces producing thereon a hard and yet elastic surface resistant to sulfur water or sulfuric acid, or other acids, and which may be used in confined places, such as mines, without the liability of producing inflammable fumes or explosive mixtures with air.

The quantity of rosin necessary in the compound will vary with the color of the rosin. When very dark eleven pounds of such rosin is a correct quantity for the stated amounts of alcohol and oil of turpentine, but when lighter colored rosins are used the quantity of rosin must be correspondingly increased up to fifteen pounds for light colored rosin but without increasing the hereinbefore given amounts of the other ingredients.

What is claimed is:—

1. An acid-proof compound for coating metals, comprising solely rosin, alcohol and oil of turpentine in substantially the proportions described.

2. An acid-proof compound for coating metals, comprising rosin, alcohol, and oil of turpentine in the proportions of substantially eleven to fifteen pounds of rosin, seven quarts of alcohol, and one quart of oil of turpentine.

In testimony whereof I affix my signature in presence of two witnesses.

EDWARD B. BONSTEIN.

Witnesses:
　PHILIP L. DRUM,
　RUTH L. MYERS.